(12) United States Patent
Nakajima

(10) Patent No.: US 7,773,280 B2
(45) Date of Patent: Aug. 10, 2010

(54) OPTICAL SCANNING DEVICE AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 766 days.

(21) Appl. No.: 11/713,044

(22) Filed: Mar. 2, 2007

(65) Prior Publication Data

US 2007/0206259 A1 Sep. 6, 2007

(30) Foreign Application Priority Data

Mar. 3, 2006 (JP) .............................. 2006-057530

(51) Int. Cl.
*G02B 26/08* (2006.01)
(52) U.S. Cl. .............. 359/204.2; 359/199.1; 359/204.1; 359/224.1; 359/224.2; 347/243
(58) Field of Classification Search ... 359/199.1–199.4, 359/224.2; 347/233, 243, 258–261
See application file for complete search history.

(56) References Cited

U.S. PATENT DOCUMENTS 6,657,765 B2  12/2003  Hayashi et al.

2002/0122217 A1  9/2002  Nakajima

FOREIGN PATENT DOCUMENTS

| JP | 10-301044 | 11/1998 |
|---|---|---|
| JP | 2924200 | 5/1999 |
| JP | 2924200 | 7/1999 |
| JP | 3011144 | 12/1999 |
| JP | 3445691 | 6/2003 |
| JP | 3543473 | 4/2004 |
| JP | 2004-279947 | 10/2004 |
| JP | 2005-024722 | 1/2005 |

*Primary Examiner*—James Phan
(74) *Attorney, Agent, or Firm*—Dickstein Shapiro LLP

(57) ABSTRACT

A disclosed optical scanning device includes: a light source unit having plural luminous sources; a light source driving unit modulating each luminous source in accordance with pixel information; an oscillating mirror supported on a twist beam as a rotation shaft, the oscillating mirror collectively deflecting light beams from the luminous sources and performing reciprocating scanning on a surface to be scanned; an imaging optical system imaging the light beams from the luminous sources on the surface to be scanned; an oscillating mirror driving unit setting a scanning frequency f in accordance with a resonance frequency of the oscillating mirror; and a pitch adjustment unit adjusting beam spot intervals p in a sub-scanning direction in accordance with the scanning frequency f of the oscillating mirror that has been set.

8 Claims, 15 Drawing Sheets

OPTICAL SCANNING DEVICE AND IMAGE FORMING APPARATUS

BACKGROUND OF THE INVENTION

1. Field of the Invention

The present invention generally relates to an optical scanning device and an image forming apparatus using the optical scanning device such as a digital copier, a laser printer, and the like and more particularly to an optical scanning device and an image forming apparatus using the optical scanning device that can be applied to optical scanning barcode reading devices, on-vehicle laser radar devices, and the like.

2. Description of the Related Art

Conventional optical scanning devices employ a polygon mirror or a galvano mirror as a deflector for light beam scanning rotating at a high speed. However, in order to achieve higher resolution images and high-speed printing, the rotation of the polygon mirror or the galvano mirror must be faster. Accordingly, durability of a bearing, heat generation due to windage, and noise are problematic and high-speed scanning have a limitation.

By contrast, research on deflection devices using silicon micromachining has progressed in recent years and proposed a method for integrally forming an oscillating mirror with a twist beam axially supporting the oscillating mirror using a silicon (hereafter referred to as Si) substrate (refer to Patent Document 1 and particularly to Patent Document 2). According to this method, it is possible to provide a small-sized deflection device with a small mirror surface. Also, this method has a merit in that low noise and low power consumption are possible in spite of high-speed operations since reciprocating oscillation is performed using resonance. In addition, this method has another merit in that a housing for storing the optical scanning device can be made of thin walls and even when a low-cost resin molding material with a low compound ratio of glass fiber is used as a housing material, such a material is not likely to cause a negative effect on image quality because of low oscillation and little heat generation of the deflection device. Further, other examples have also been proposed in which an oscillating mirror is disposed instead of a polygon mirror (refer to Patent Document 3 and Patent Document 4, for example).

In the following, general characteristics of an oscillating mirror are considered. FIG. 17 is a diagram showing a rectangular plate-like oscillating mirror generally assumed. Twist beams protrude from a center of faces on both ends of the oscillating mirror in a longitudinal direction and a center of the twist beams is a rotation axis. When a size of the oscillating mirror is described based on a width d in parallel with the rotation axis, a width 2r orthogonal to the rotation axis, and a thickness t, and a size of the twist beam is described based on a length h and a width a, moment of inertia $I=(4\rho r dt/3) \cdot r2$ spring constant $K=(G/2h) \cdot \{at(a2+t2)/12\}$, where density of Si is $\rho$ and material constant is G. Resonance frequency $f0=(1/2\pi)\cdot\sqrt{(K/I)}=(1/2\pi)/\sqrt{\{Gat(a2+t2)/24LI\}}$. In this case, a length L of the twist beam and a swing angle $\theta0$ are substantially in a proportional relationship, so that swing angle $\theta0=\kappa/I\cdot f02$ and $\kappa$ is represented by a constant ... (1). Resonance frequency f0 is changed by spring constant K of the twist beam and swing angle $\theta$ is also changed in accordance therewith.

Further, when density of air is $\eta$ relative to a circumferential speed $\upsilon$ and an area $E(=2rd)$ of the oscillating mirror, viscous drag of air $p=c \cdot \eta \upsilon^2 \cdot E^3$ (c is a constant) works against rotation of the oscillating mirror.

On the other hand, a relationship between oscillation torque T and swing angle $\theta0$ is represented by $\theta0=\kappa' \cdot T/K$ ($\kappa'$ is a constant)... (2)

Thus, so as to stably maintain the swing angle $\theta$, a current to be applied may be adjusted in order to generate rotation torque T in accordance with a change of spring constant K of the twist beam and air resistance.

As mentioned above, the spring constant of the twist beam is changed due to temperature and the resonance frequency is changed, or the viscous drag of air is changed due to atmospheric pressure, so that the change of the swing angle is problematic. In view of this, an optical scanning device has been proposed in which the swing angle is detected by detecting a scanned beam and the swing angle is stably maintained by adjusting a current to be applied to the oscillating mirror (refer to Patent Document 5, for example).

On the other hand, when the resonance frequency becomes high, the swing angle $\theta$ of the oscillating mirror becomes small. In view of this, a certain method has been generally known in which an optical scanning speed is increased by increasing the number of luminous sources and simultaneously scanning plural lines (refer to Patent Document 6, for example). Further, an example has been proposed in which a semiconductor laser array having plural luminous sources and a resonant oscillating mirror are combined (refer to Patent Document 7, for example).

Patent Document 1: Japanese Patent No. 2924200
Patent Document 2: Japanese Patent No. 3011144
Patent Document 3: Japanese Patent No. 3445691
Patent Document 4: Japanese Patent No. 3543473
Patent Document 5: Japanese Laid-Open Patent Application No. 2004-279947
Patent Document 6: Japanese Laid-Open Patent Application No. 10-301044
Patent Document 7: Japanese Laid-Open Patent Application No. 2005-24722

As mentioned above, by using the oscillating mirror as a light deflector instead of a polygon mirror, low noise and low power consumption are possible, so that it is possible to provide an optical scanning device and an image forming apparatus using the same suitable for an office environment. Moreover, when the housing of the optical scanning device is made of thin walls, for example, it is possible to achieve reduction in weight and cost. On the other hand, in the semiconductor laser array used as a luminous source, plural luminous sources are arranged at regular intervals in a monolithic manner. A light source unit is positioned and supported in an area orthogonal to an optical axis such that light beams from the luminous sources are arranged in the oscillating mirror and on an extended line of the twist beams on both ends of the oscillating mirror.

When a sub-scanning component of an arrangement pitch of the plural luminous sources is d' and magnification of an imaging optical system in a sub-scanning direction is $\beta$, beam spot intervals p (mm) in the sub-scanning direction is expressed as: $p=\beta \cdot d'$. On the other hand, when the number of luminous sources is n and movement speed of a surface to be scanned is v (mm/s), scanning line intervals p' is expressed as: $p'=v/n \cdot f$, where f (Hz) is a scanning frequency of the oscillating mirror. Originally, p=p' is expected. However, the scanning frequency f is adjusted to a resonance frequency f0 of the oscillating mirror or set in a resonance band in the neighborhood of the resonance frequency f0, so that if dispersion of the resonance frequency f0 is large, intervals of adjacent scanning lines become uneven. In other words, the intervals of scanning lines set from the imaging magnification and the intervals of scanning lines across the oscillating mirror do not correspond to each other, so that unevenness of density is generated and this may be a factor in substantial derogation of image quality. Further, in a tandem multicolor image forming apparatus having plural image forming stations, when the beam spot intervals p are not accurately arranged in each station, color drift or color change may be generated.

SUMMARY OF THE INVENTION

It is a general object of the present invention to provide an improved and useful optical scanning device and image forming apparatus in which the above-mentioned problems are eliminated.

A more specific object of the present invention is to provide an optical scanning device and image forming apparatus that can perform high-quality image forming without color drift or color change by adjusting the beam spot intervals p or the scanning frequency f such that the scanning line intervals are equally arranged relative to the scanning frequency f of the oscillating mirror set in an arbitrary manner or the beam spot intervals p in the sub-scanning direction.

According to one aspect of the present invention, there is provided an optical scanning device comprising: a light source unit having plural luminous sources; a light source driving unit modulating each luminous source in accordance with pixel information; an oscillating mirror supported on a twist beam as a rotation shaft, the oscillating mirror collectively deflecting light beams from the luminous sources and performing reciprocating scanning on a surface to be scanned; an imaging optical system imaging the light beams from the luminous sources on the surface to be scanned; an oscillating mirror driving unit setting a scanning frequency f in accordance with a resonance frequency of the oscillating mirror; and a pitch adjustment unit adjusting beam spot intervals p in a sub-scanning direction in accordance with the scanning frequency f of the oscillating mirror that has been set.

According to another aspect of the present invention, there is provided an optical scanning device comprising: a light source unit having plural luminous sources; a light source driving unit modulating each luminous source in accordance with pixel information; an oscillating mirror supported on a twist beam as a rotation shaft, the oscillating mirror collectively deflecting light beams from the luminous sources and performing reciprocating scanning on a surface to be scanned; an imaging optical system imaging the light beams from the luminous sources on the surface to be scanned; and an oscillating mirror driving unit setting a scanning frequency f in the neighborhood of a resonance frequency of the oscillating mirror within a resonance band, wherein the oscillating mirror driving unit adjusts the scanning frequency f of the oscillating mirror in accordance with beam spot intervals p in a sub-scanning direction.

According to another aspect of the present invention, in the above-mentioned optical scanning device, the light source unit includes plural luminous sources as a semiconductor laser array arranged substantially in parallel with the rotation shaft of the oscillating mirror.

According to another aspect of the present invention, in the above-mentioned optical scanning device, the light source driving unit adjusts a modulation frequency for each luminous source in accordance with the scanning frequency f of the oscillating mirror that has been set.

According to another aspect of the present invention, in the above-mentioned optical scanning device, the light source driving unit performs image recording in one of going scan and returning scan of the oscillating mirror.

According to another aspect of the present invention, in the above-mentioned optical scanning device, the oscillating mirror driving unit makes an adjustment such that the oscillating mirror has a predetermined swing angle in accordance with the scanning frequency f that has been set.

According to another aspect of the present invention, the above-mentioned optical scanning device includes: a light detection unit detecting a light beam used for scanning by the oscillating mirror, wherein the swing angle is corrected based on a detection signal.

According to another aspect of the present invention, there is provided an image forming apparatus moving a surface to be scanned in a sub-scanning direction and performing an electrophotographic process so as to form an image on the surface to be scanned, the image forming apparatus comprising the above-mentioned optical scanning device as a device for performing an exposure process in an electrophotographic process.

According to another aspect of the present invention, the above-mentioned image forming apparatus includes: a speed adjustment unit adjusting a movement speed v of the surface to be scanned in accordance with the scanning frequency f of the oscillating mirror that has been set.

According to one aspect of the present invention, even when the scanning frequency is set in the neighborhood of the resonance frequency of each oscillating mirror, based on scanning line intervals determined therefrom, it is possible to set intervals of plural beam spots in the sub-scanning direction. Thus, it is possible to have uniform scanning line intervals and form a high-quality image without unevenness of density, color drift, or color change.

According to another aspect of the present invention, even when the intervals of the plural beam spots are arbitrarily set in the sub-scanning direction, based on the scanning line intervals determined therefrom, it is possible to set the scanning frequency of the oscillating mirror. Thus, it is possible to have uniform scanning line intervals and form a high-quality image without unevenness of density, color drift, or color change.

According to another aspect of the present invention, the pitch of the luminous sources is set in a semiconductor process in a monolithic manner. Thus, it is possible to set accurately the plural beam spot intervals in the sub-scanning direction with little chronological fluctuation. Therefore, it is possible to have uniform scanning line intervals and form a high-quality image without unevenness of density, color drift, or color change.

According to another aspect of the present invention, it is possible to set dot intervals in the main scanning direction such that the dot intervals correspond to the scanning line intervals in the sub-scanning direction. Thus, it is possible to have an uniform aspect ratio and record a high-quality image without image distortion.

According to another aspect of the present invention, it is possible to maintain each scanning line in a parallel manner even when plural luminous sources are used for recording an image at the same time. Thus, the necessity of complicated drawing control such as sorting of pixel data is eliminated and it is possible to form a high-quality image without unevenness of density.

According to another aspect of the present invention, even when the scanning frequency f can be arbitrarily set, it is possible to maintain a maximum swing angle, namely, amplitude in a predetermined value. A surface shape of an imaging optical system is determined using $\theta/\theta 0$ (swing angle/amplitude) as a parameter. Thus, by constantly maintaining the amplitude, it is possible to have uniform dot intervals and form a high-quality image without unevenness of density. According to another aspect of the present invention, even when the amplitude is fluctuated due to a change of the resonance frequency of the oscillating mirror accompanied by a temporal change of temperature and the like, the amplitude is constantly maintained by detecting the fluctuation and adjusting a gain of voltage or current applied to the oscillating mirror. Thus, it is possible to have uniform dot intervals and form a high-quality image without unevenness of density.

According to another aspect of the present invention, by using the oscillating mirror as a light deflector, it is possible to provide an image forming apparatus with low power consumption and low noise while using characteristics of the oscillating mirror.

According to another aspect of the present invention, it is possible to set the movement speed of the surface to be scanned such that the scanning line intervals in the sub-scanning direction are constant relative to the beam spot intervals p in the sub-scanning direction determined from magnification of the imaging optical system and the scanning frequency fd determined from the resonance frequency. Thus, it is possible to form a high-quality image without unevenness of density, color drift, or color change.

Other objects, features and advantage of the present invention will become more apparent from the following detailed description when read in conjunction with the accompanying drawings.

DETAILED DESCRIPTION OF THE PREFERRED EMBODIMENTS

In the following, examples of an optical scanning device and an image forming apparatus according to the present invention will be described with reference to the accompanying drawings.

Figure 1:
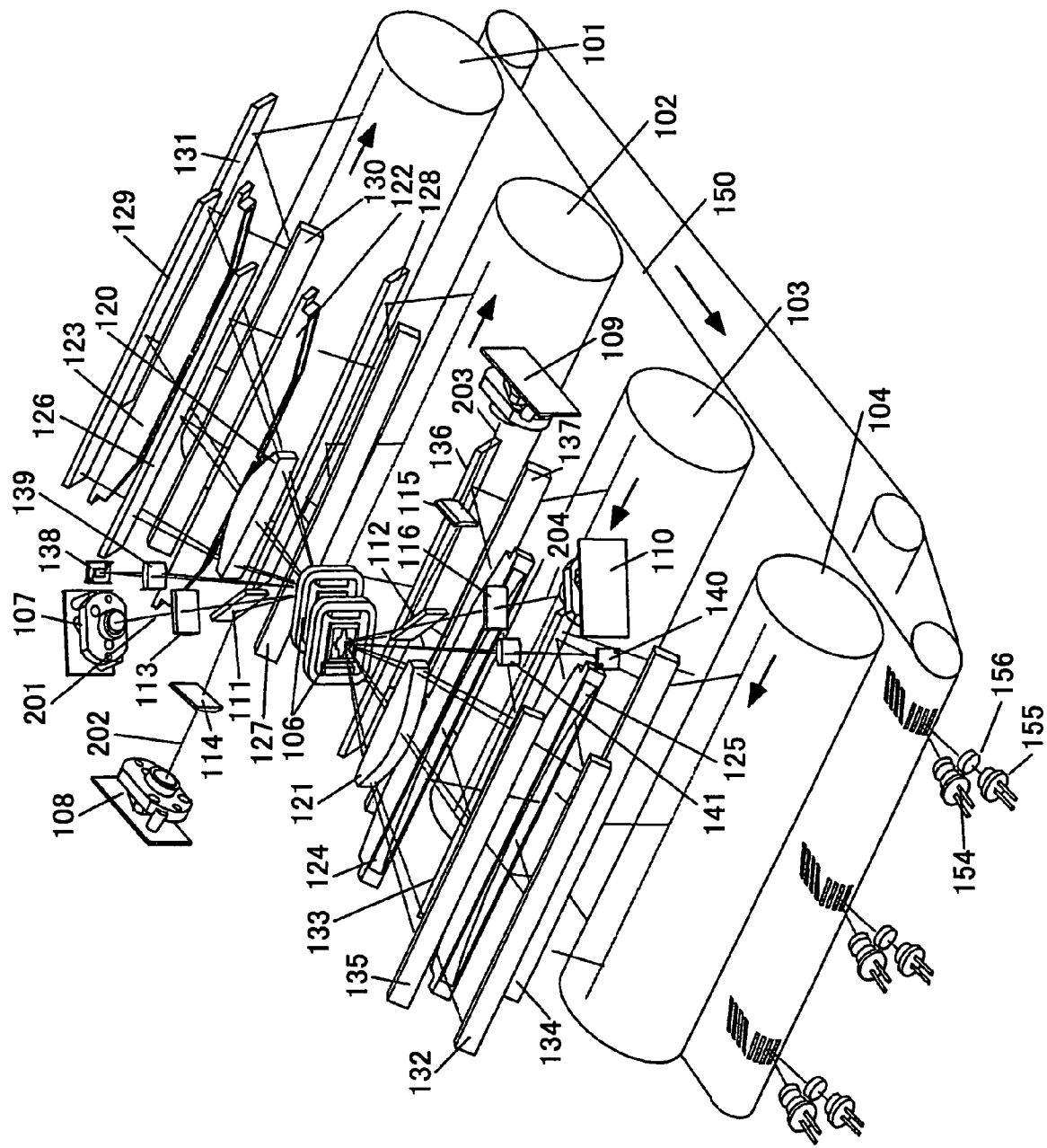
FIG. 1 is a perspective view showing an example of an optical scanning device according to the present invention.

FIG. 1 is a perspective view showing an example of an optical scanning device scanning in four image forming stations. The four stations are divided into two groups of two stations in which a light beam is projected onto each of a pair of oscillating mirrors 106 disposed so as to face opposite directions, the light is deflected, and scanning is performed. Four photoconductor drums 101, 102, 103, and 104 are arranged at regular intervals in a direction of movement of a transfer belt 150 as an intermediate transfer body. A color image is formed by sequentially transferring and superposing toner images of different colors formed in the four photoconductor drums 101, 102, 103, and 104. The optical scanning device for scanning each photoconductor drum is incorporated in a single housing, in which a beam from the light source unit is deflected and used for scanning through the oscillating mirrors separately disposed, the beam corresponding to image signals of each color component and being modulated and driven in accordance with the image signals of each color component.

Figure 13:
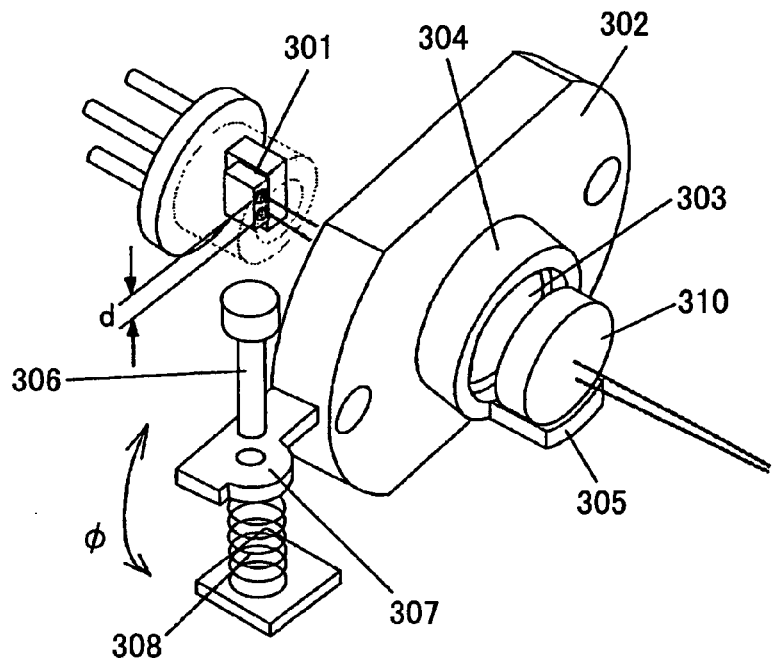
FIG. 13 is a perspective view showing an example of a light source unit applicable to an optical scanning device according to the present invention.

FIG. 13 is a perspective view showing an example of the light source unit applicable to the optical scanning device shown in FIG. 1. In FIG. 13, a semiconductor laser array 301 as a light source includes two luminous sources monolithically formed in the sub-scanning direction with a pitch of 50 μm. The semiconductor laser array 301 is press-fitted and fixed in a fit opening 303 formed in a central portion of a semi-oval holder 302 from a backside of the holder 302 such that the semiconductor laser array 301 is positioned based on a circumference of a stem of the semiconductor laser array 301 and in a rotation direction along the circumference of the stem. On a front side of the holder 302, a cylindrical protrusion 304 is formed integrally with the holder 302 along a circumference of the fit opening 303. A partially circular protrusion 305 is integrally formed with the protrusion 304 by further protruding a lower portion of the protrusion 304. A coupling lens 310 is positioned by disposing a circumferential surface of the coupling lens 310 along the protrusion 305. The coupling lens 310 is positioned relative to an optical axis of a luminous point such that the optical axis corresponds to a projection axis of the semiconductor laser array 301 and a projected beam of light becomes a parallel beam of light. The coupling lens 310 is fixed by filling a space between the protrusion 305 and the coupling lens 310 with UV adhesive (ultraviolet curable adhesive) and curing the filled adhesive.

The above-mentioned protrusion 304 of the holder 302 is used as a positioning reference when the holder 302 is supported in the housing that is not shown in the drawings. An extended lever unit 307 is installed from one side portion of the holder 302. An adjust screw 306 is screwed on the lever unit 307 via a coil spring 308, so that an arrangement angle φ of the luminous sources can be adjusted through rotation adjustment based on the protrusion 304. In the example shown in FIG. 1, four light source units 107, 108, 109, and 110 are disposed and all the units have the same structure as described above. In the example shown in FIG. 13, although the number of luminous sources n of the semiconductor laser array 301 is "2", the number is not limited to this. Plural beams are emitted from the light source unit such that the beams are arranged in a line in the sub-scanning direction and the emitted beams are projected on a cylinder lens symmetrically relative to a generating line of the cylinder lens as will be mentioned below.

In FIG. 1, the two oscillating mirrors 106 are arranged back-to-back in parallel at a central portion of the optical scanning device. The oscillating mirrors 106 collectively deflect light beams so as to perform scanning, the light beams being emitted from each light source unit and projected onto the oscillating mirrors 106 with a tilt of a predetermined angle in the sub-scanning direction. The two light source units 107 and 108 and another two light source units 109 and 110 are disposed for each of the above-mentioned two oscillating mirrors 106 and arranged at a symmetrical position relative to the central portion of the optical scanning device. Each light source unit is arranged such that emission positions of the light source units 107 and 110 are shifted by predetermined intervals from emission positions of the light source units 108 and 109. Further, each light source unit is arranged such that when each oscillating mirror 106 is stationary, namely, scanning angle θ=0, light beams 201 and 202 from the light source units 107 and 108 deflected by one oscillating mirror 106 are coaxially arranged and light beams 203 and 204 from the light source units 109 and 110 deflected by the other oscillating mirror 106 are coaxially arranged.

In addition to the oscillating mirrors 106 arranged back-to-back in parallel at the central portion of the optical scanning device, a scanning imaging lens and a mirror are arranged symmetrically relative to the two oscillating mirrors 106 and the four photoconductor drums are also arranged symmetrically in the right and left directions at regular intervals. The light beams emitted from the four light source units are modulated in accordance with image signals corresponding to yellow, cyan, magenta, and black, and each oscillating mirror 106 is oscillated. In accordance with this, it is possible to draw images of each color on each photoconductor drum at the same time. Upon drawing the images, timing of one of the oscillating mirrors 106 is delayed by ½ period relative to the other oscillating mirror 106 based on a detection signal of a synchronization detection sensor described later and the images are drawn when one of the oscillating mirror 106 performs scanning in a returning direction. In accordance with this, it is possible to arrange scanning directions of each station.

The light source units are arranged such that the light beams 201, 202, 203, and 204 from each light source unit are projected onto each oscillating mirror with an incident angle of 35° (=α/2+θd) in the main scanning direction relative to a normal line of each oscillating mirror 106. The light beams 201 and 204 from the light source units 107 and 110 are directly projected onto the oscillating mirror 106. The light beams 202 and 203 from the light source units 108 and 109 are reflected on incident mirrors 111 and 112 and horizontally projected on each oscillating mirror 106 while optical paths of the light beams 202 and 203 are arranged to have the same optical paths as those of the light beams 201 and 204 in the main scanning direction.

Cylinder lenses 113, 114, 115, and 116 include a plane surface on one side and a curved surface on the other side, the curved surface having a common curvature in the sub-scanning direction, and are arranged such that lengths of the optical paths of each beam to deflection points of the oscillating mirrors 106 are set to be the same. The light beams from each of the light source units 107 and 108 are projected on the cylinder lenses 113 and 114 while the light beams are shifted in the sub-scanning direction across the optical axis, so that the light beams are bent by refractive power of the cylinder lenses 113 and 114 and projected obliquely onto a deflection surface of one of the oscillating mirrors 106 such that the light beams are crossed in the vicinity of the deflection surface. In the same manner, the light beams from each of the light source units 109 and 110 are projected on the cylinder lenses 115 and 116 while the light beams are shifted in the sub-scanning direction across the optical axis, so that the light beams are bent by refractive power of the cylinder lenses 115 and 116 and projected obliquely onto a deflection surface of the other oscillating mirrors 106 such that the light beams are crossed in the vicinity of the deflection surface. The light beams are converged by each cylinder lens at the deflection surface of the oscillating mirror 106 such that the light beams are arranged in a lineal manner in the main scanning direction. A combination of the cylinder lenses and toroidal lenses mentioned later constitute an optical system of optical face tangle error correction in which the deflection points and surfaces of the photoconductors are conjugated in the sub-scanning direction. The light beams are deflected by the two oscillating mirrors 106 and divided into two beams in the right and left directions. And, after the deflection, the light beams are projected onto scanning lenses 120 and 121 while a space between the light beams is increased so as to separate the light beams from each other.

The scanning lenses 120 and 121 are formed through resin molding so as to have a non-circular surface shape with refractive power such that f·arcsin characteristics are obtained in accordance with sine wave oscillation of the oscillating mirror in the main scanning direction, namely, a change of the main scanning position dH/dθ per scanning angle unit is in proportion to $\sin^{-1}(\theta/\theta 0)$. The main scanning position for each pixel is corrected such that the beams are moved at substantially the same speed on the surfaces of the photoconductors in accordance with a rotation of the oscillating mirror 106. The scanning lenses 120 and 121 focus each beam on each photoconductor drum in a spot-like shape in cooperation with toroidal lenses 122, 123, 124, and 125 described later. A latent image is recorded by performing scanning using each beam on the surface of each photoconductor drum.

In the example shown in the drawings, the oscillating mirror 106 of each color station is disposed such that a rotation axis of the oscillating mirror 106 corresponds to a center of an image in the main scanning direction. Three mirrors are disposed per station such that the lengths of the optical paths from the oscillating mirror 106 to the surface of each photoconductor drum are the same and the projection positions and the incident angles for the photoconductor drums arranged at regular intervals are the same. Regarding the optical path in each color station, the light beam 201 from the light source unit 107 is tilted downward by passing through the cylinder lens 113 and is projected onto the oscillating mirror 106. The light deflected by the oscillating mirror 106 passes through the scanning lens 120 and then the light is reflected on a mirror 126 to pass trough the toroidal lens 122. Thereafter, the light is reflected on mirrors 127 and 128 and is introduced to the photoconductor drum 103, thereby forming a magenta image in a second station.

The light beam 202 from the light source unit 108 is tilted upward by passing through the cylinder lens 114 and is reflected on the incident mirror 111 to be projected onto the oscillating mirror 106. The light deflected by the oscillating mirror 106 passes through the scanning lens 120 and then the light is reflected on a mirror 129 to pass trough the toroidal lens 123. Thereafter, the light is reflected on mirrors 130 and 131 and is introduced to the photoconductor drum 104, thereby forming a yellow image in a first station.

Third and fourth stations disposed symmetrically relative to the oscillating mirrors 106 perform operations in the same manner. The light beam 203 from the light source unit 109 is reflected on the incident mirror 112 and projected onto the oscillating mirror 106. The light deflected by the oscillating mirror 106 is reflected on mirrors 132, 133, and 134 and is introduced to the photoconductor drum 101, thereby forming a black image in the fourth station. Further, the light beam 204 from the light source unit 110 is deflected by the oscillating mirror 106 and reflected on mirrors 135, 136, and 137 to be introduced to the photoconductor drum 102, thereby forming a cyan image in the third station. In addition, these constituent parts of the optical scanning device are integrally incorporated and stored in a single housing that is not shown in the drawings.

Regarding the two stations on one side relative to the central portion between the right and left directions, a synchronization detection sensor 138 for detecting a beam outside a photoconductor scanning area is disposed lateral to the light source unit 107. Regarding the two stations on the other side, a synchronization detection sensor 140 for detecting a beam outside a photoconductor scanning area is disposed lateral to the light source unit 110. The synchronization detection sensors 138 and 140 are mounted on a substrate and generate a synchronization detection signal in each station based on a beam detection signal outside the photoconductor scanning area so as to adjust timing to start drawing an image.

In the vicinity of a roller in an exit side of the transfer belt 150, there is disposed a detection unit facing the transfer belt 150 rotating along a circumferential surface of the roller and forming a cylindrical surface. The detection unit includes an LED element 154 for lightning, a photosensor 155 for receiving a reflected light, and a pair of condenser lenses 156. The detection unit is disposed so as to detect accuracy of superposition of images of each color formed in each station and superposed on the transfer belt 150. The detection unit detects a drift of a main scanning register and a sub-scanning register from a reference station by reading a detection pattern of toner images formed on the transfer belt 150. The drift is detected periodically and control for correcting the drift is performed. In the example, detection units are disposed on three locations so as to detect the drift in three locations of both ends and a center of the image. The detection units are constructed so as to read a difference of detection time from black color as a reference color in accordance with movement of the transfer belt.

Figure 16:
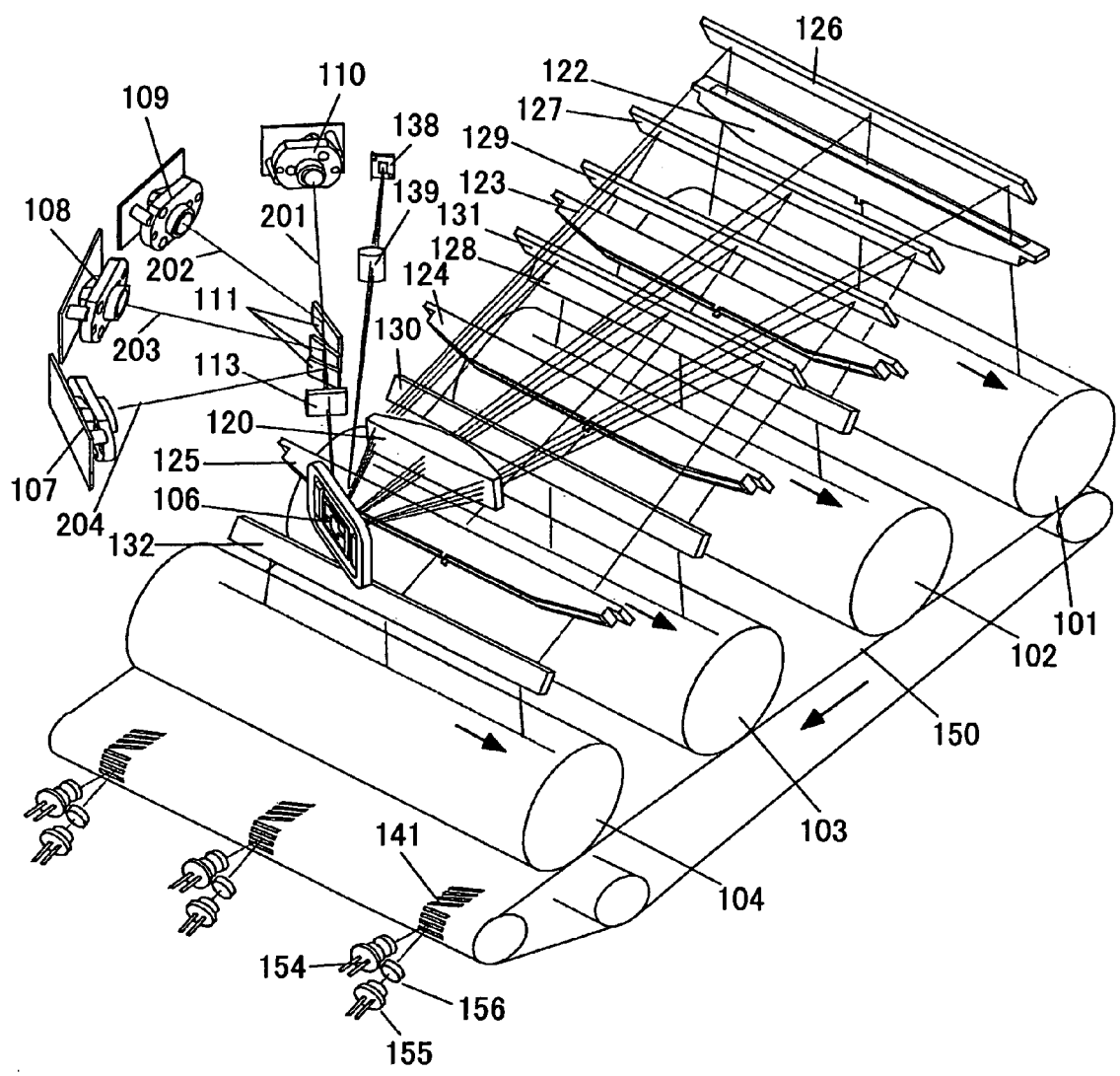
FIG. 16 is a perspective view showing another example of an optical scanning device according to the present invention.
Figure 17:
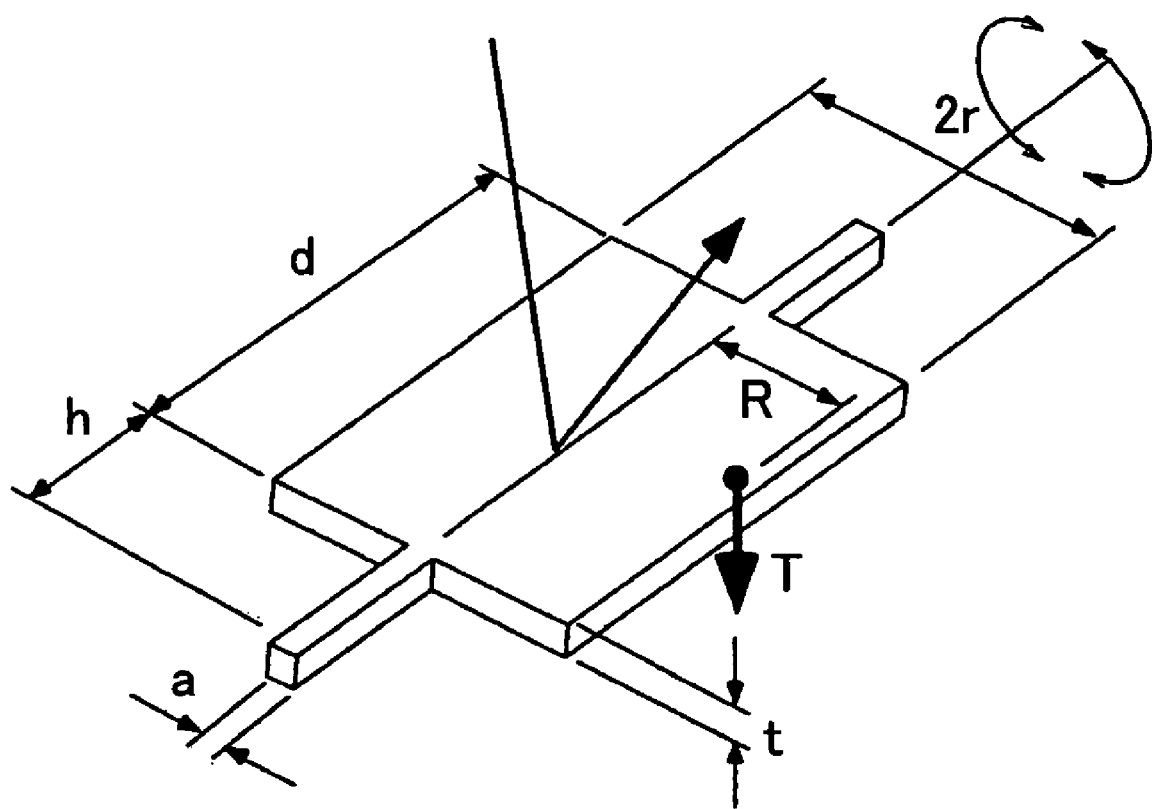
FIG. 17 is a perspective view showing an oscillating mirror having a simple shape generally assumed.

FIG. 16 is a perspective view showing another example of an optical scanning device in which the four image forming stations form images by performing optical scanning using a single oscillation mirror. An optical scanning device for scanning each of the photoconductor drums 101, 102, 103, and 104 is integrally incorporated in a housing that is not shown in the drawings, the housing being disposed above the photoconductor drums. The four photoconductor drums 101, 102, 103, and 104 are arranged at regular intervals on the intermediate transfer belt 150 as a transfer body in a direction of movement of the transfer belt 150. Light beams from light source units for each of the photoconductor drums are deflected by a single oscillating mirror 106 and then separated again to be introduced to each photoconductor drum and images for each color component are formed on each photoconductor drum at the same time. By projecting the beams from each light source unit onto the oscillating mirror 106 obliquely with incident angles different in the sub-scanning direction, the beams from each light source unit are collectively deflected and scanning is performed.

The light source units 107, 108, 109, and 110 are arranged at locations of heights different in the sub-scanning direction such that the light source unit 110 is disposed in the highest position, then the light source units 109, 108, and 107 are disposed sequentially in descending order of height. Moreover, the light source units 107, 108, 109, and 110 are arranged radially along a circle in a horizontal direction. Regarding a height of the beam 201 from the light source unit 110, the beams 202, 203, and 204 from other light source units have gradually different heights. Three incident mirrors 111 are disposed at these heights of the three beams. The beams are reflected on the incident mirrors 111 such that the beams 202, 203, and 204 are arranged vertically in a line in this order. These beams and the light beam 201 are projected onto the cylinder lens 113 with heights different in the sub-scanning direction and the beams are directed to the oscillating mirror 106 from the cylinder lens 113.

The beams are crossed by the cylinder lens 113 in the sub-scanning direction in the vicinity of the deflection surface of the oscillating mirror 106. After the deflection by the oscillating mirror 106, the beams are projected on an fθ lens 120 while a space between the beams is gradually increased. The fθ lens 120 is commonly used for the beams of all the stations and has no convergence capability in the sub-scanning direction. Among the beams from each light source unit that have passed through the fθ lens 120, the beam from the light source unit 107 is reflected on the mirror 126. The reflected beam is focused on the photoconductor drum 101 in a spot-like shape via the toroidal lens 122 and scans the photoconductor drum 101. The photoconductor drum 101 forms a latent image based on image information on yellow color in a first image forming station.

Among the beams that have passed through the fθ lens 120, the beam from the light source unit 108 is reflected on the mirror 127 and passes through the toroidal lens 123 to be reflected on the mirror 128. The reflected beam is focused on the photoconductor drum 102 in a spot-like shape and scans the photoconductor drum 102. The photoconductor drum 102 forms a latent image based on image information on magenta color in a second image forming station.

Among the beams that have passed through the fθ lens 120, the beam from the light source unit 109 is reflected on the mirror 129 and passes through the toroidal lens 124 to be reflected on the mirror 130. The reflected beam is focused on the photoconductor drum 103 in a spot-like shape and scans the photoconductor drum 103. The photoconductor drum 103 forms a latent image based on image information on cyan color in a third image forming station. Among the beams that have passed through the fθ lens 120, the beam from the light source unit 110 is reflected on the mirror 131 and passes through the toroidal lens 125 to be reflected on the mirror 132. The reflected beam is focused on the photoconductor drum 104 in a spot-like shape and scans the photoconductor drum 104. The photoconductor drum 104 forms a latent image based on image information on black color in a fourth image forming station.

The synchronization detection sensor 138 is disposed lateral to the light source unit 110. In the same manner as in the synchronization detection sensor shown in FIG. 1, the light beam deflected by the oscillating mirror 106 goes past the scanning lens 120 and is converged by an imaging lens 139 such that the converged light beam is projected onto the synchronization detection sensor 138. A synchronization detection signal of each station is generated based on a detection signal of the synchronization detection sensor 138.

Figure 2:
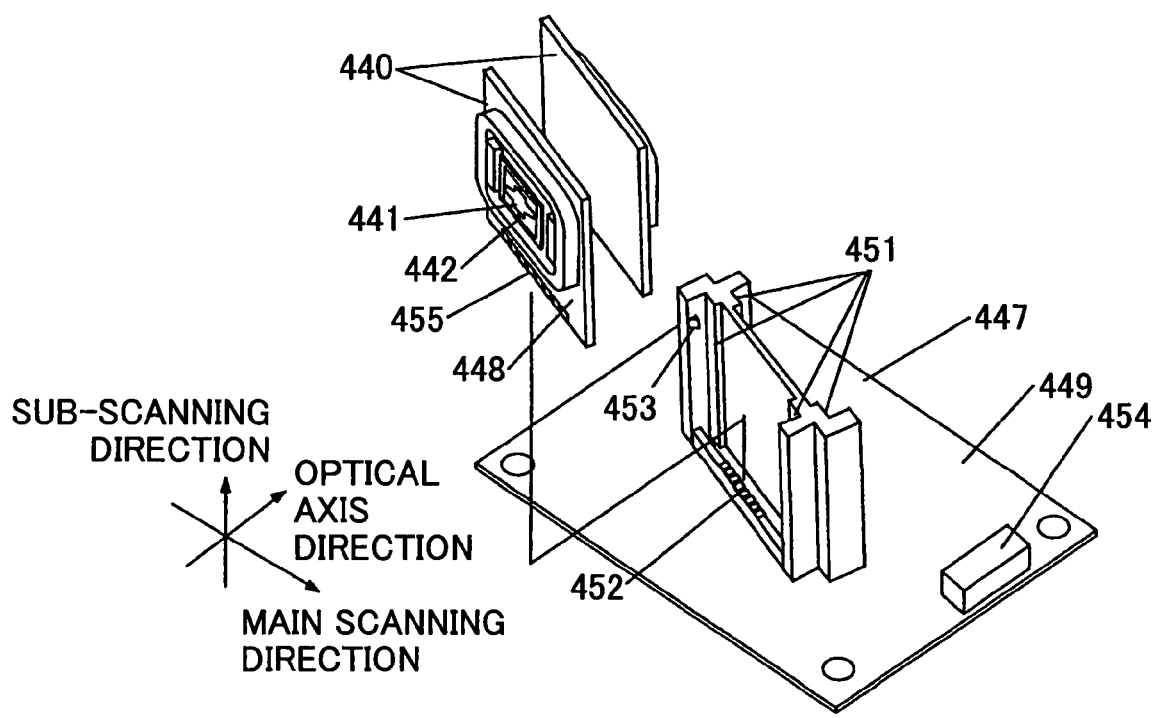
FIG. 2 is an exploded perspective view showing an example of a mechanism for installing an oscillating mirror applicable to the example.

FIG. 2 is an exploded perspective view showing an example of a structure of an oscillating mirror module in the example of the optical scanning device shown in FIG. 1. In the example of this oscillating mirror module, electromagnetic driving is employed so as to generate running torque of the oscillating mirror. In FIG. 2, reference numeral 441 designates an oscillating mirror and the oscillating mirror 441 is axially supported by a twist beam 442. The oscillating mirror 441, the twist beam 442, and a frame integrated with the oscillating mirror 441 and the twist beam 442 are manufactured by penetrating an outer shape from a single Si substrate through etching and are installed on a mounting substrate 448, thereby constituting an oscillating mirror substrate 440. In the example shown in FIG. 2, the oscillating mirror module is constructed by integrating a pair of the oscillating mirror substrates 440 in a back-to-back manner.

The oscillating mirror module is supported by a support member 447. The support member 447 is formed using resin, used also as a circuit board 449, and positioned at a predetermined location in the circuit board 449. On a top face of the circuit board 449, a supporter for holding the pair of the oscillating mirror substrates 440 in a back-to-back manner is fixed in an upright manner. On both faces of the supporter, there is formed a positioning unit 451 positioning the pair of the oscillating mirror substrates 440 such that mirror surfaces thereof are in parallel with each other. When the pair of the oscillating mirror substrates 440 are positioned in the positioning unit 451, each oscillating mirror surface is tilted by a predetermined degrees relative to the main scanning direction. In the example, the oscillating mirror surface is tilted by 30°. Each oscillating mirror substrate 440 is mounted on the mounting substrate 448 and a wiring terminal 455 is formed in a lower side of the mounting substrate 448. The above-mentioned supporter includes an edge connector unit 452 in which metal terminal blocks are arranged such that the wiring terminal 455 of the mounting substrate 448 is brought into contact when the pair of the oscillating mirror substrates 440 are positioned and mounted.

It is possible to install the oscillating mirror substrate 440 on the support member 447 by inserting the lower side into the edge connector unit 452 so as to fit the oscillating mirror substrate 440 into an inner side relative to a press pawl 453 and positioning both side edge portions on a backside of the oscillating mirror substrate 440 along the positioning unit 451. By installing the oscillating mirror substrates 440, electrical wiring is made at the same time and it is possible to replace each oscillating mirror substrate 440 separately. On the circuit board 449, there are mounted a control IC, a crystal oscillator, and the like constituting a circuit for driving the oscillating mirrors and power supply and control signals are input and output via a connector 454 fixed on the circuit board 449.

Figure 3A:
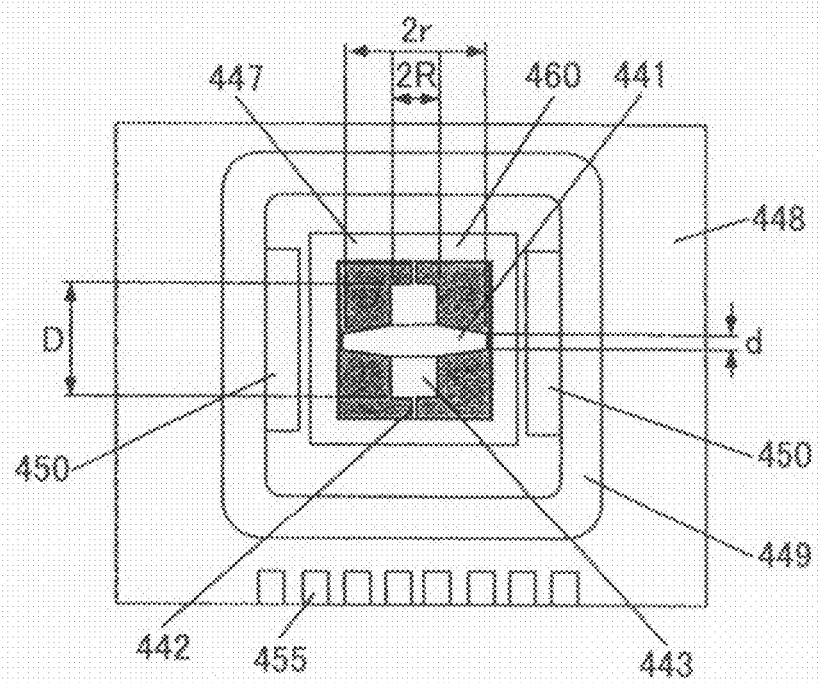
FIG. 3A is a front view of an oscillating mirror applicable to the present invention.
Figure 3B:
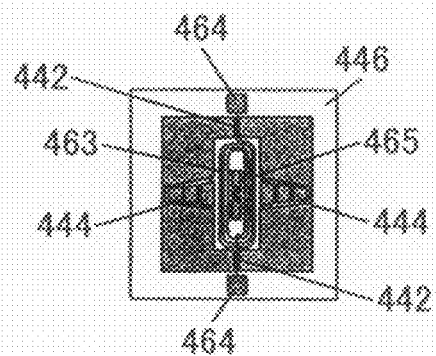
FIG. 3B is a rear view of an oscillating mirror applicable to the present invention.
Figure 3C:
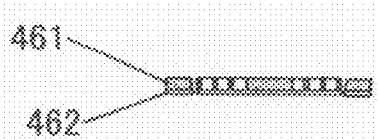
FIG. 3C is a bottom view of an oscillating mirror applicable to the present invention.
Figure 14:
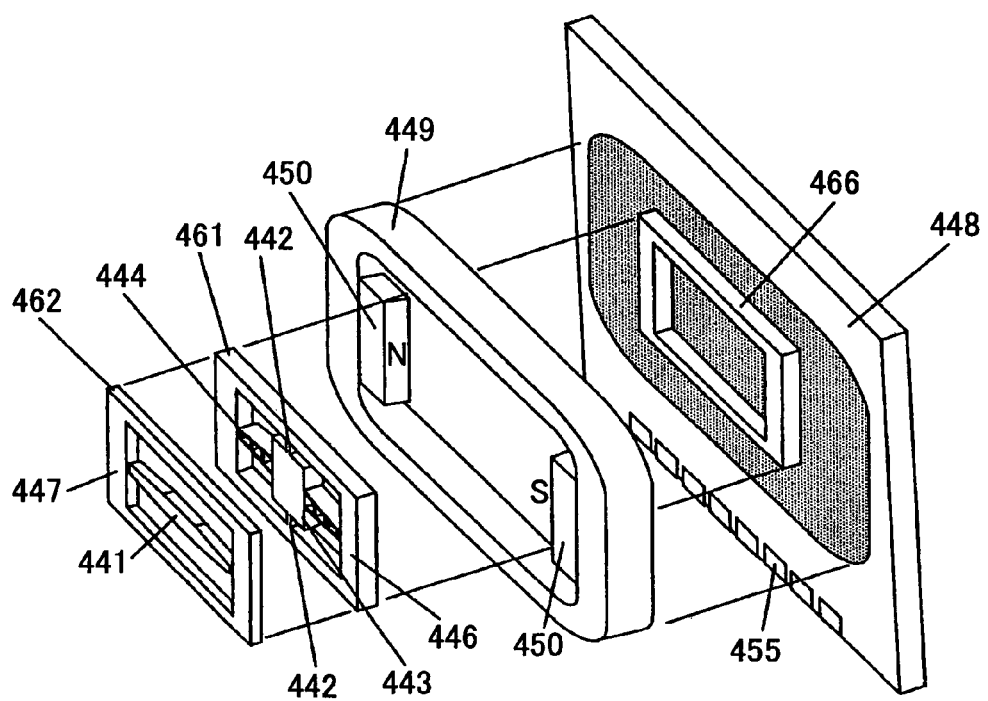
FIG. 14 is an exploded perspective view showing an example of an oscillating mirror substrate applicable to the present invention.

Next, the oscillating mirror substrate 440 is described in detail with reference to the FIGS. 3 and 14. FIG. 14 is an exploded perspective view showing an example of the oscillating mirror substrate 440. An oscillating mirror structure 460 includes a mirror surface on a surface thereof, a moving unit constituting an oscillator, a twist beam supporting the moving unit and constituting a rotation shaft, and a frame constituting a support unit for these moving unit and twist beam. The oscillating mirror structure 460 is formed by cutting out from a Si substrate through etching. In the example shown in FIG. 14, a wafer referred to as SOI is used, in which an oxide film is held between two substrates having thicknesses of 60 μm and 140 μm and the two substrates are bonded in advance. The oscillating mirror structure 460 is manufactured in the following procedure. First, a substrate 461 with the thickness of 140 μm (second substrate) is penetrated to the oxide film through a dry process of plasma etching from a surface of the substrate 461 except the twist beam 442, an oscillating plate 443 in which a planar coil is formed, a reinforced beam 444 constituting a main portion of the moving unit, and a frame 446. Next, a substrate 462 with the thickness of 60 μm (first substrate) is penetrated to the oxide film through anisotropic etching such as KOH from a surface of the substrate 462 except the oscillating mirror 441 and the support member 447. Thereafter, the oxide film around the moving unit is removed and separated, thereby forming the oscillating mirror structure.

Widths of the twist beam 442 and the reinforced beam 444 are set as 40 to 60 μm. It is desirable to have a small moment of inertia I of the oscillator so as to have a large swing angle of the oscillating mirror. However, when a thickness of the oscillating mirror is reduced so as to have a small moment of inertia, the mirror surface is deformed due to inertial force, so that the example has a structure where the moving unit has a cavity. Further, an aluminum thin film is deposited on the surface of the substrate 462 with the thickness of 60 μm so as to form a reflection surface. And, on the surface of the substrate 461 with the thickness of 140 μm, a terminal 464 wired via a coil pattern 463 and the twist beam is formed using a copper thin film and a patch 465 for trimming is formed. As will be described later, although a thin film permanent magnet is disposed on a frame 447 facing the oscillating plate 443 where the planar coil is formed, it is possible to dispose the thin film permanent magnet on the oscillating plate 443 and the planar coil on the support member 447.

As shown in FIG. 14, on the mounting substrate 448, there are disposed a frame-like base 466 for installing the oscillating mirror structure 460 (refer to FIG. 3) and a yoke 449 formed in a window-frame shape so as to surround the oscillating mirror structure 460. In the yoke 449, a pair of permanent magnets is bonded such that S-pole and N-pole of each magnet are disposed at ends of the moving mirror in an opposing manner and a magnetic field is generated in a direction orthogonal to a rotation axis. When the oscillating mirror structure 460 is installed on the base 466 with the mirror surface face up and a current is applied between the terminals 464, Lorentz force is generated in each side parallel to a rotation axis of the coil pattern 463 (refer to FIG. 3) and rotation torque T for twisting the twist beam 442 to rotate the oscillating mirror 441 is generated. When the current supply is stopped, the oscillating mirror 441 is returned to be a horizontal position due to return force of the twist beam. In accordance with this, by alternately switching directions of current applied to the coil pattern 463, it is possible to cause the moving mirror 441 to reciprocally oscillate. When a cycle of the switching of current is brought close to a natural frequency of a primary oscillation mode with the twist beam as the rotation axis in the structure constituting the oscillating mirror, namely, the resonance frequency f0, amplitude is excited, so that it is possible to gain a large swing angle.

The resonance frequency f0 is determined in accordance with the moment of inertia I of the oscillator constituting the oscillating mirror as mentioned above. Thus, when accuracy of finished dimension is not uniform, difference is generated between oscillating mirrors. Usually, a scanning frequency fd is separately determined in accordance with the resonance frequency f0.

In addition, as mentioned above, the beam spot intervals p on the surface of the photoconductor drum in the sub-scanning direction are determined in accordance with the arrangement pitch d of the luminous sources and the magnification β of the imaging optical system in the sub-scanning direction. Accordingly, when the scanning frequency fd is changed, a distance where the photoconductor drum is moved during a single scanning determined based on the scanning frequency fd is, when a movement speed is v and the number of lines to be scanned at the same time is n, expressed as: v/fd(mm), so that if this does not correspond to n·p(mm), unevenness of density may be generated.

Figure 15:
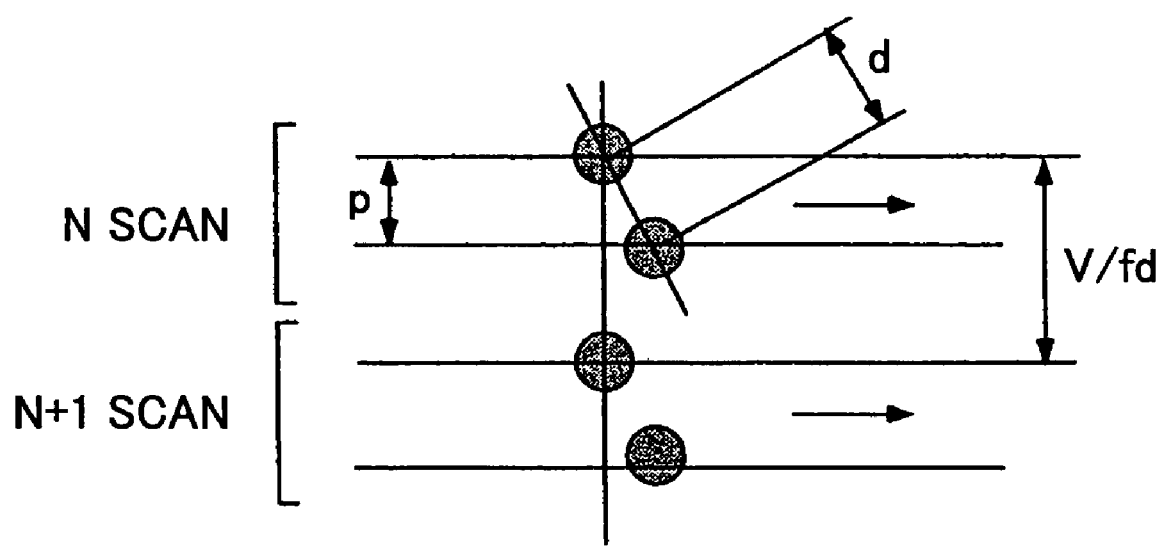
FIG. 15 is a schematic diagram showing beam spot intervals p being set in the sub-scanning direction by adjusting an arrangement of beam spots on a surface of a photoconductor drum.

In view of this, in one example, as shown in FIG. 15, the light source unit is tilted by φ through rotation adjustment in a face orthogonal to the optical axis and supported, so that an arrangement of beam spots is adjusted on the surface of the photoconductor drum and the beam spot intervals p in the sub-scanning direction are set. The beam spot intervals p are expressed as: p=β·d·cosφ, where d is the arrangement pitch of the plural luminous sources. The beam spot intervals p are set in accordance with the scanning frequency fd.

On the other hand, when plural oscillating mirrors are used, it is difficult to have the same scanning frequency fd for each oscillating mirror. This variation of the resonance frequency f0 is about ±200 Hz depending on process capability. For example, when the scanning frequency fd=2 kHz, displacement of scanning line pitch corresponding to 1/10 line is generated, so that a scanning position is displaced by one line when recording is performed as much as 10 lines. Although it is possible to combine oscillating mirrors having close resonance frequencies f0 through selection, production efficiency becomes poor and oscillating mirrors must always be handled in pairs upon replacement, so that an increase of cost is problematic.

In view of this, in a second example, before the oscillating mirror is installed on the mounting substrate, the moment of inertia I is adjusted by making an incision in the patch 465 (refer to FIG. 3B) formed on a backside of the moving unit using a carbon dioxide gas laser or the like so as to gradually reducing mass of the moving unit. Thus, substantially the same resonance frequency f0 is obtained for each oscillating mirror even if there is a difference of dimensions between the oscillating mirrors. In the example, the resonance frequency f0 is adjusted to be within ±50 Hz in advance and a predetermined scanning frequency fd is set within the frequency band in accordance with the beam spot intervals p in the sub-scanning direction determined depending on the imaging optical system. When scanning frequency fd is shifted from the resonance frequency f0 and is set within the frequency band, it is possible to set a predetermined swing angle θ by performing a gain adjustment as will be described later.

Figure 4:
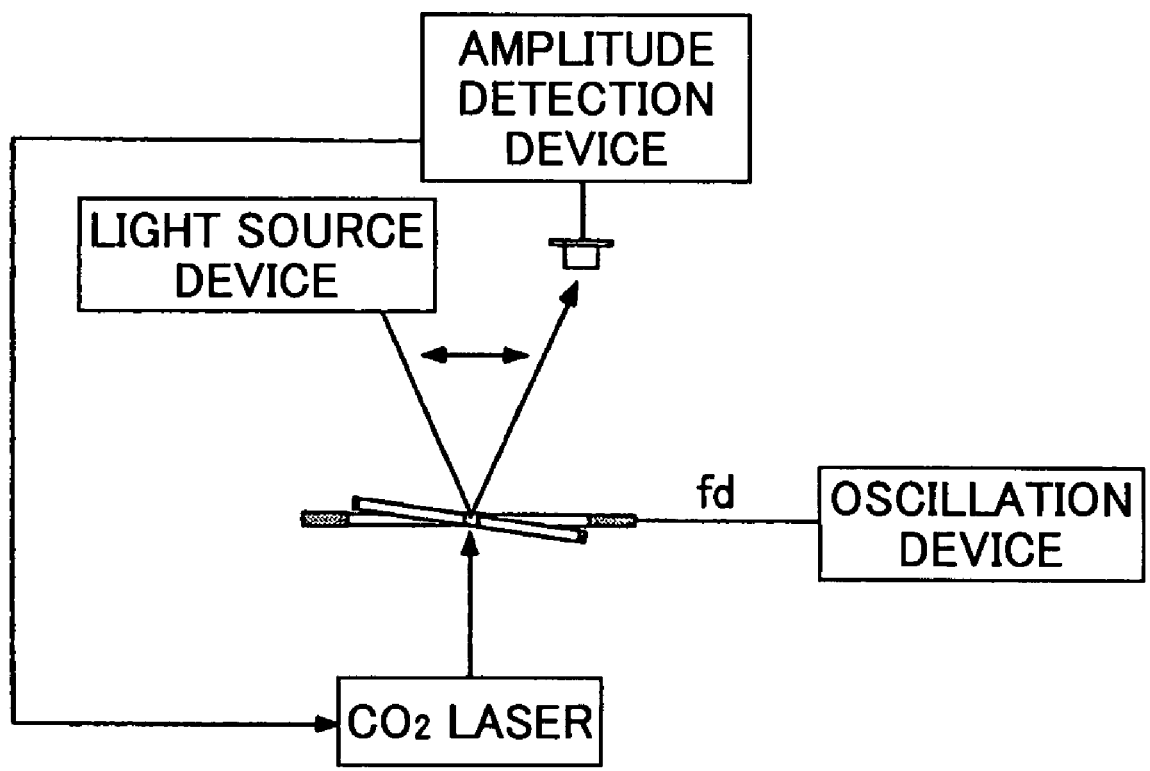
FIG. 4 is a block diagram schematically showing an example of a device for detecting amplitude of an oscillating mirror applicable to the present invention.

FIG. 4 is a block diagram showing how the resonance frequency is adjusted by varying (trimming) the mass of the oscillating mirror. Oscillation corresponding to the scanning frequency is applied to the oscillating mirror from a vibration exciter. A carbon dioxide gas ($CO_2$) laser is irradiated onto the patch 465 (refer to FIG. 3B) from the backside of the oscillating mirror and an incision is made until the swing angle is steeply increased due to resonance. It is possible to detect the resonance by irradiating the beam onto the oscillating mirror from the surface side thereof and detecting a swing of a reflected beam. In addition, the resonance frequency may be adjusted by attaching balance weight without using the above-mentioned trimming for reducing weight.

Figure 5:
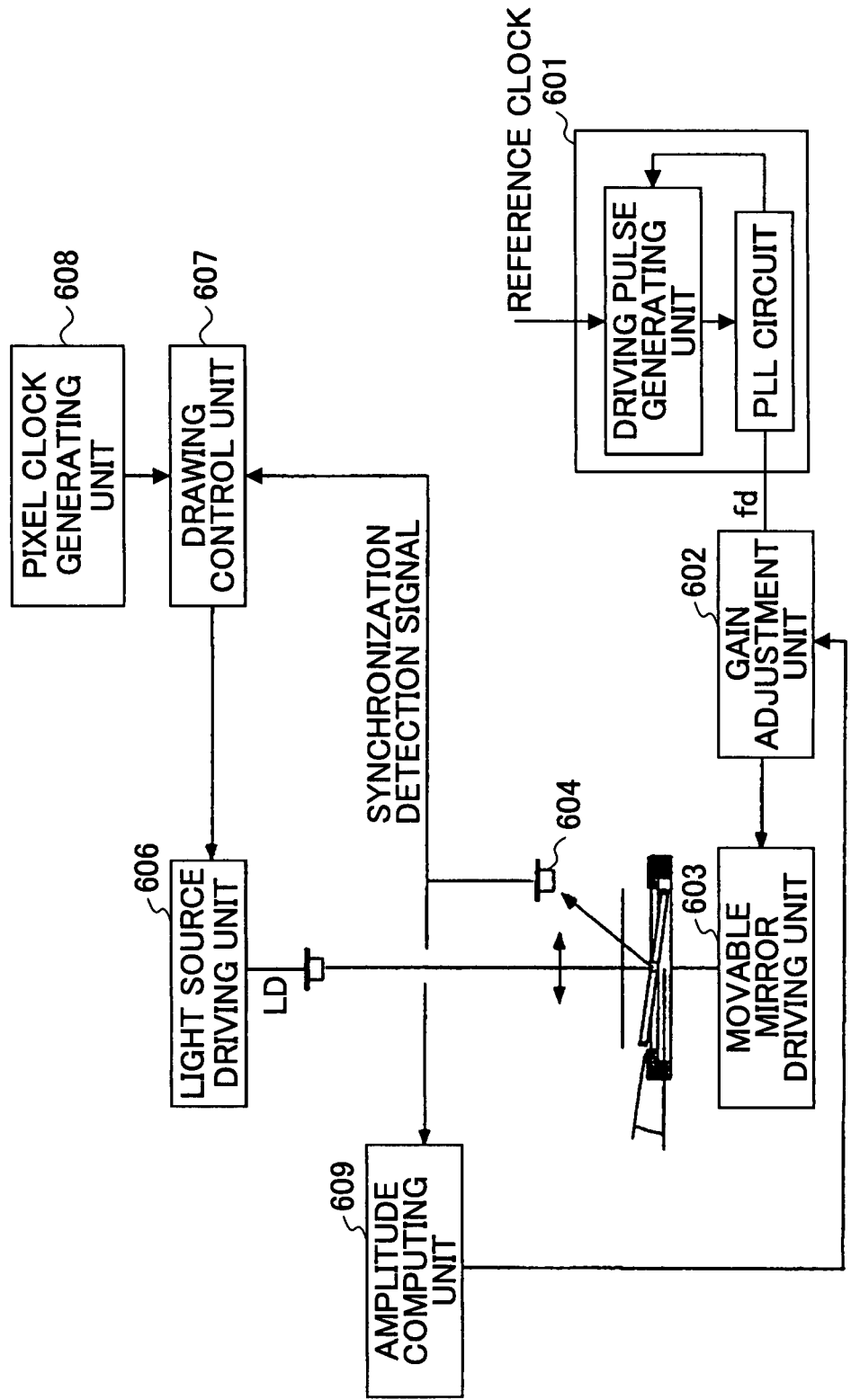
FIG. 5 is a block diagram showing an example of a device for controlling a swing angle of an oscillating mirror applicable to the present invention.

FIG. 5 is a block diagram showing an example of a driving circuit for oscillating the oscillating mirror. As mentioned above, an alternating voltage or a pulse shape voltage from a moving mirror driving unit 603 is applied to the planar coil formed on the backside of the oscillating mirror such that directions of current flow are alternately switched. In accordance with this, the oscillating mirror is oscillated and a gain of current flown in the planar coil is adjusted by the gain adjustment unit 602 so as to have a constant swing angle θ. The swing angle θ is detected by a synchronization signal detection unit included in the optical scanning device. In other words, a light source driving unit 606 drives a semiconductor laser (LD) as a light source and a laser beam emitted from the semiconductor laser is irradiated onto the oscillating mirror and a reflected light is received in a light receiving element 604. A detection signal of the light receiving element 604 is calculated in an amplitude computing unit 609 and the swing angle θ of the oscillating mirror is obtained. The obtained swing angle θ is input to the gain adjustment unit 602, so that a gain of the moving mirror driving unit 603 is adjusted such that the swing angle θ of the moving mirror is constant.

Figure 6:
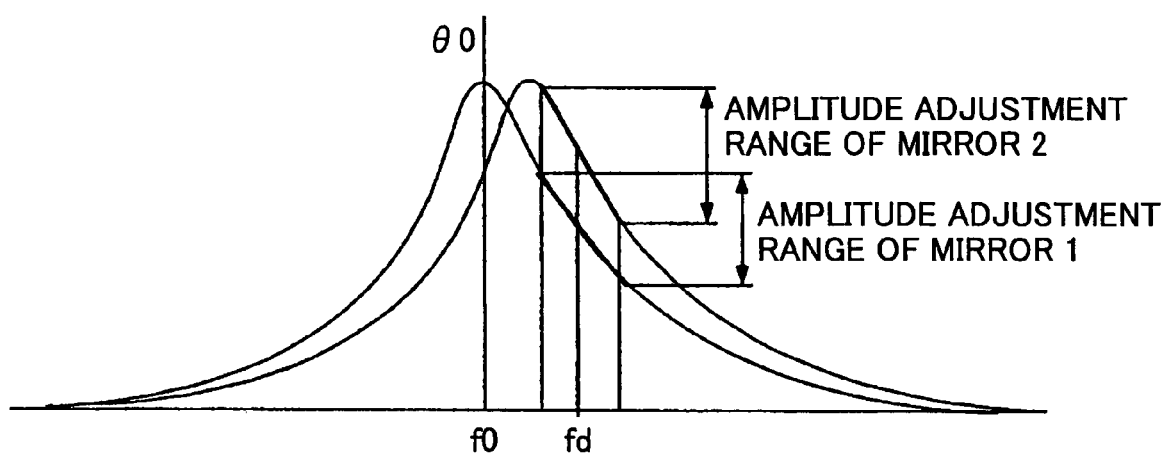
FIG. 6 is a graph showing a relationship between a frequency f for switching directions of a current flow and a swing angle θ in an oscillating mirror.

FIG. 6 is a graph showing a relationship between a frequency f for switching directions of current flow and the swing angle θ. Generally, frequency characteristics are obtained in which the resonance frequency f0 is a peak and when the scanning frequency fd corresponds to the resonance frequency f0, the swing angle is maximized. However, in the neighborhood of the resonance frequency, the swing angle is steeply changed. Thus, although it is possible to set the driving frequency at an initial stage in the driving control unit of the moving mirror such that the driving frequency applied to a fixed electrode corresponds to the resonance frequency, when the resonance frequency varies due to a change of a spring constant accompanied by a temperature change, the swing angle is sharply decreased, so that this is problematic in that chronological stability is insufficient.

In view of this, in the example, the scanning frequency fd is fixed at a single frequency that does not correspond to the resonance frequency f0 and the swing angle θ can be increased and decreased in accordance with the gain adjustment. Specifically, the scanning frequency fd is 2.5 kHz relative to the resonance frequency f0=2 kHz, and the gain adjustment is performed such that the swing angle θ is ±25°. As shown in FIG. 5, in a clock generating unit 601 including a driving pulse generating unit and a PLL circuit, it is possible to arbitrarily set the scanning frequency fd using a clock obtained by dividing a reference clock. Thus, at the initial stage, it is possible to adjust the scanning frequency fd by changing a dividing ratio in accordance with the-resonance frequency f0 of the oscillating mirror. Chronologically, the beam used for scanning by the oscillating mirror is detected upon returning scan in the synchronization detection sensor 604 disposed at a start position of a scan area. The swing angle θ of the oscillating mirror is detected from a difference of time between a detection signal detected as mentioned above and a detection signal detected upon going scan. And, control is performed so as to have a constant swing angle θ.

Figure 7:
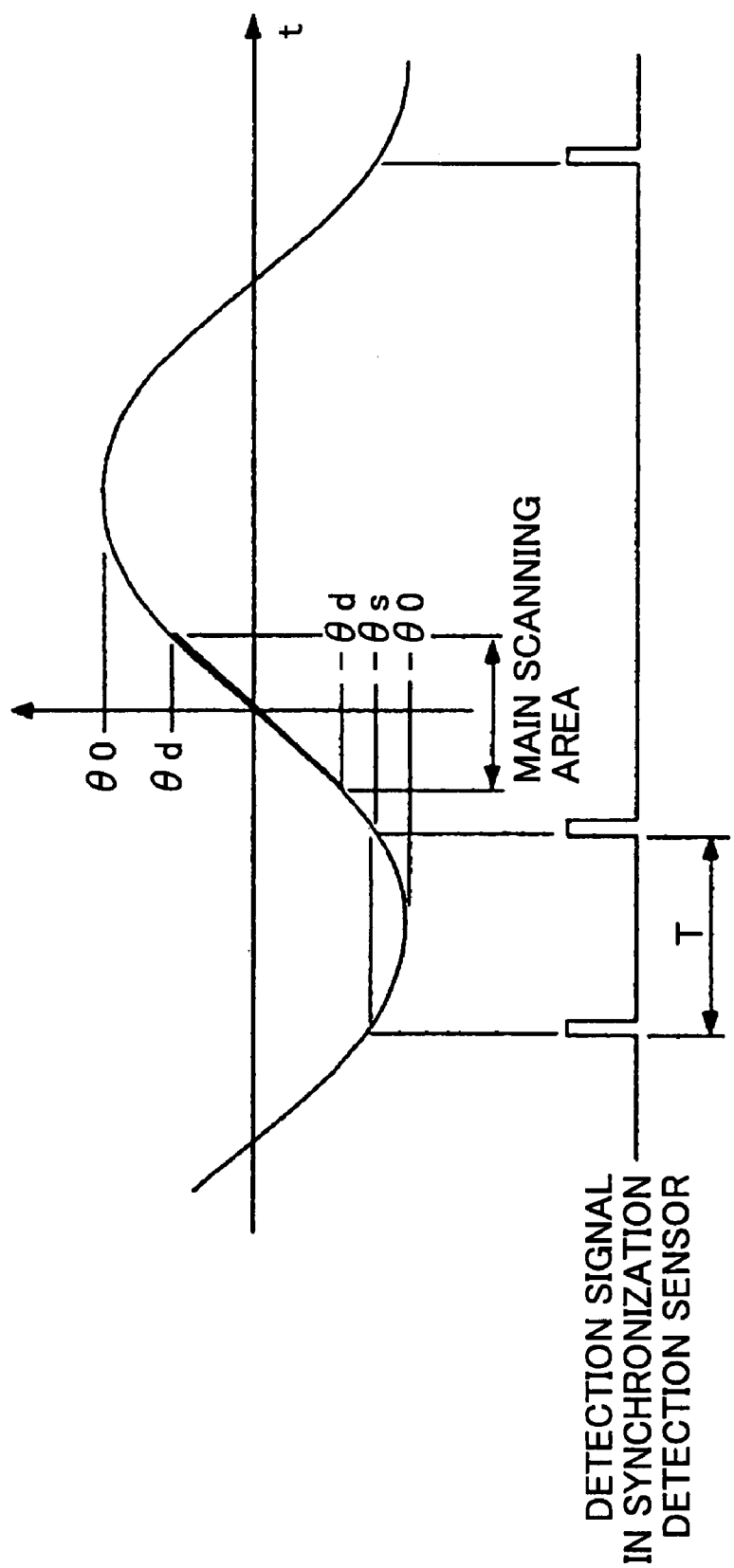
FIG. 7 is a graph showing a change of a scanning angle θ in a sinusoidal manner due to resonance of an oscillating mirror with the passage of time t.

As shown in FIG. 7, the oscillating mirror is resonantly oscillated, so that the swing angle θ is changed in a sinusoidal manner with the passage of time t. In accordance with this, when a maximum swing angle of the oscillating mirror, namely, amplitude is θ0, θ=θ0·sin2ρfd·t. When a beam with a scanning angle of 2θs is detected in the synchronization detection sensor 604, a detection signal is generated in returning scan and going scan. When a time difference T is used, θs=θ0·cos2πfd·T/2. θs is fixed, so that it is possible to detect the maximum swing angle θ0 by measuring T. In addition, in a period from the beam detection in returning scan to the beam detection in going scan, namely, while θ0>θ>θs in terms of the swing angle of the oscillating mirror, emission of light from the luminous sources is prohibited.

On the surface of the photoconductor drum as a surface to be scanned, it is necessary to form dots in the main scanning direction such that intervals of each pixel are uniform in terms of time. As mentioned above, the scanning frequency fd of the oscillating mirror differs depending on the resonance frequency f0 in each oscillating mirror, so that it is necessary to shift a pixel clock for modulating the luminous sources in accordance therewith.

Figure 8:
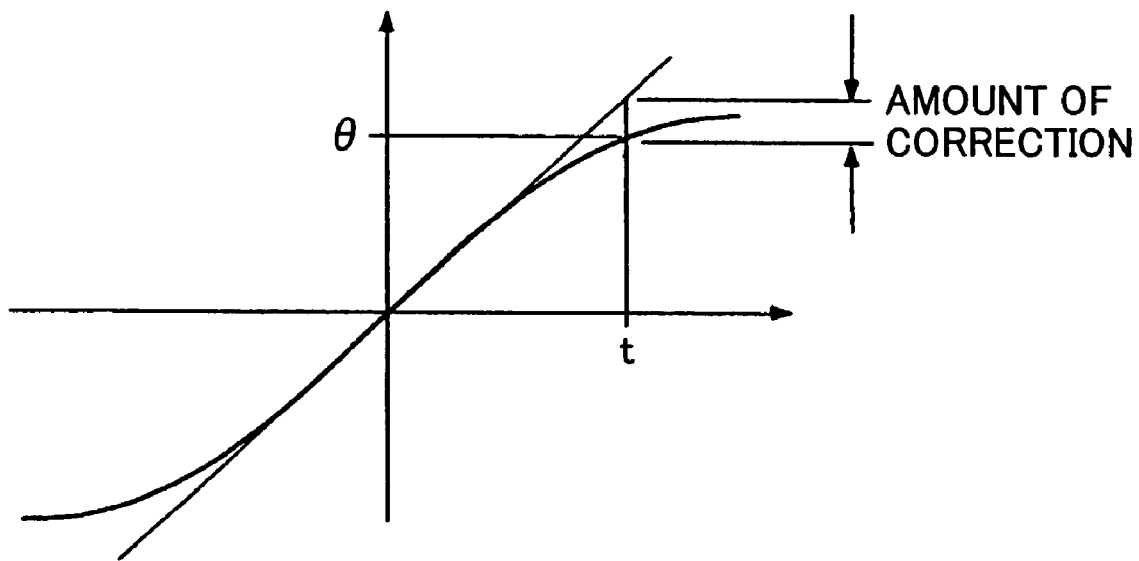
FIG. 8 is a graph showing pixel intervals being prolonged by an oscillating mirror at both end portions of a main scanning area.

Further, as shown in FIG. 8, the oscillating mirror has a rate of change of the swing angle θ being reduced at an accelerating pace with the passage of time, so that the pixel intervals are spread on the scanned surface toward both end portions in the main scanning area. In general, this displacement is corrected by using an f·arcsin lens for a scanning lens. However, if the pixel clock performs modulation using a single frequency in the same manner as in scanning with a polygon mirror, it is necessary to set power (refracting power) along the main scanning direction such that an amount of correction of the main scanning position is largest at an end of the main scanning area so as to have the scanning angle 2θ proportional to time. In this case, when a time from an image height 0, namely, a center of an image to a given image height H is t, a relationship between the image height H and the swing angle θ (scanning angle 2θ) is expressed as: $H=\omega \cdot t=(\omega/2\pi fd)\cdot \sin^{-1}(\theta/\theta 0)$, where ω is a constant.

However, when a density of the pixel intervals, namely, an amount of correction in what is called linearity is increased, a deviation of power of the scanning lens along the main scanning direction is increased, so that a change of a diameter of a beam spot corresponding to each pixel on the scanned surface is increased. Thus, in the example, a phase Δt of the pixel clock is changed in accordance with the main scanning position so as to minimize the deviation of power of the scanning lens along the main scanning direction.

When a change of the scanning angle accompanied by the change of the phase Δt of the pixel clock is 2Δθ, $$H=(\omega/2\pi fd)\cdot \sin^{-1}\{(\theta-\Delta\theta)/\theta 0\}$$

$$\Delta\theta/\theta 0 = \sin 2\pi fdt - \sin 2\pi fd(t-\Delta t).$$

In this case, when power allocation of the scanning lens is configured to be close to that of the fθ lens and a remaining difference is corrected using the phase Δt of the pixel clock, $$H = (\omega/2\pi fd)\cdot \{(\theta-\Delta\theta)/\theta 0\}$$
$$= (\omega/2\pi fd)\cdot \sin^{-1}(\theta/\theta 0)$$
$$\Delta\theta/\theta 0 = \theta/\theta 0 - \sin^{-1}(\theta/\theta 0).$$

The luminous sources may be modulated such that a phase Δt (sec) of a predetermined pixel along the main scanning direction is determined based on:

$$(\theta/\theta 0) - \sin^{-1}(\theta/\theta 0) = \sin 2\pi fdt - \sin 2\pi fd(t-\Delta t).$$

Figure 9:
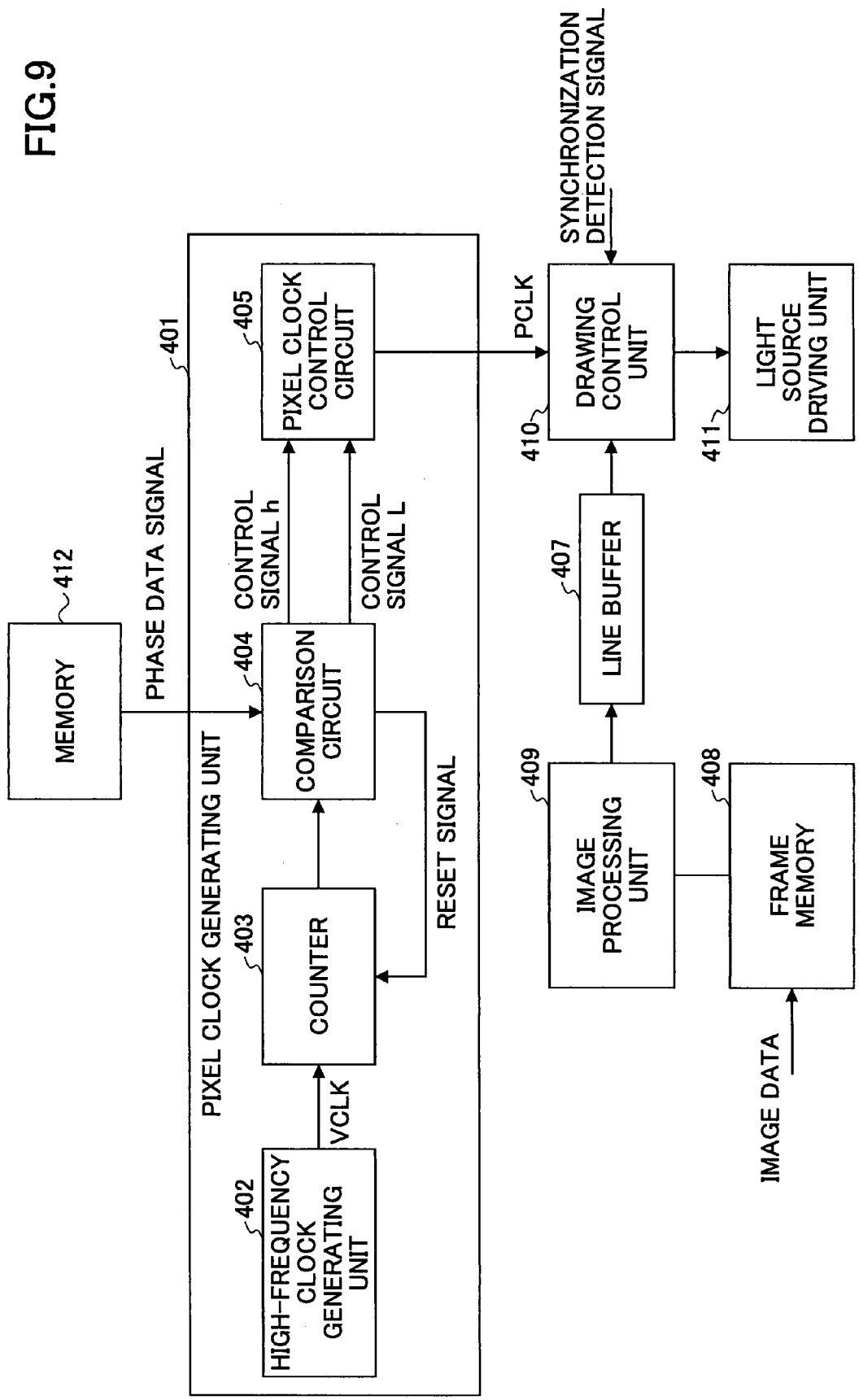
FIG. 9 is a block diagram showing an example of a driving circuit for modulating a semiconductor laser as a luminous source.

FIG. 9 is a block diagram showing an example of a driving circuit for modulating a semiconductor laser as a luminous source. In FIG. 9, image data rasterized in each color is temporarily stored for each color in a memory 408, the image data is sequentially read out in an image processing unit 409, pixel data for each line is formed referring to a relationship between the previous and next lines in accordance with a halftone-enabled matrix pattern, and the formed data is transferred to a line buffer 407 for each luminous source. A drawing control circuit 410 reads out each pixel data from the line buffer 407 by using a synchronization detection signal as a trigger, and a light source driving unit 411 independently modulates each light source using each pixel data.

Next, a clock generating unit 401 modulating each luminous point is described. A counter 403 counts a high-frequency clock VCLK generated in a high-frequency clock generating circuit 402. A comparison circuit 404 compares a setting value L set in advance based on the above-mentioned count value and a duty ratio with a phase data signal H provided from an external memory 412 as a transitional time of the pixel clock, the phase data signal H specifying an amount of phase shift. When the count value corresponds to the above-mentioned setting value L, the comparison circuit 404 outputs a control signal L for instructing falling of a pixel clock PCLK. When the count value corresponds to the phase data H, the comparison circuit 404 outputs a control signal h for instructing rising of the pixel clock PCLK. The counter 403 is reset simultaneously with the control signal h and counts from 0 again, so that the counter 403 is capable of forming a successive pulse line.

In this manner, the phase data signal H is provided per clock and the pixel clock PCLK is generated in which pulse periods are successively changed. In the example, the pixel clock PCLK is prepared by dividing the high-frequency clock VCLK by 8 and is capable of changing a phase thereof with a resolution of ⅛ clock.

Figure 10:
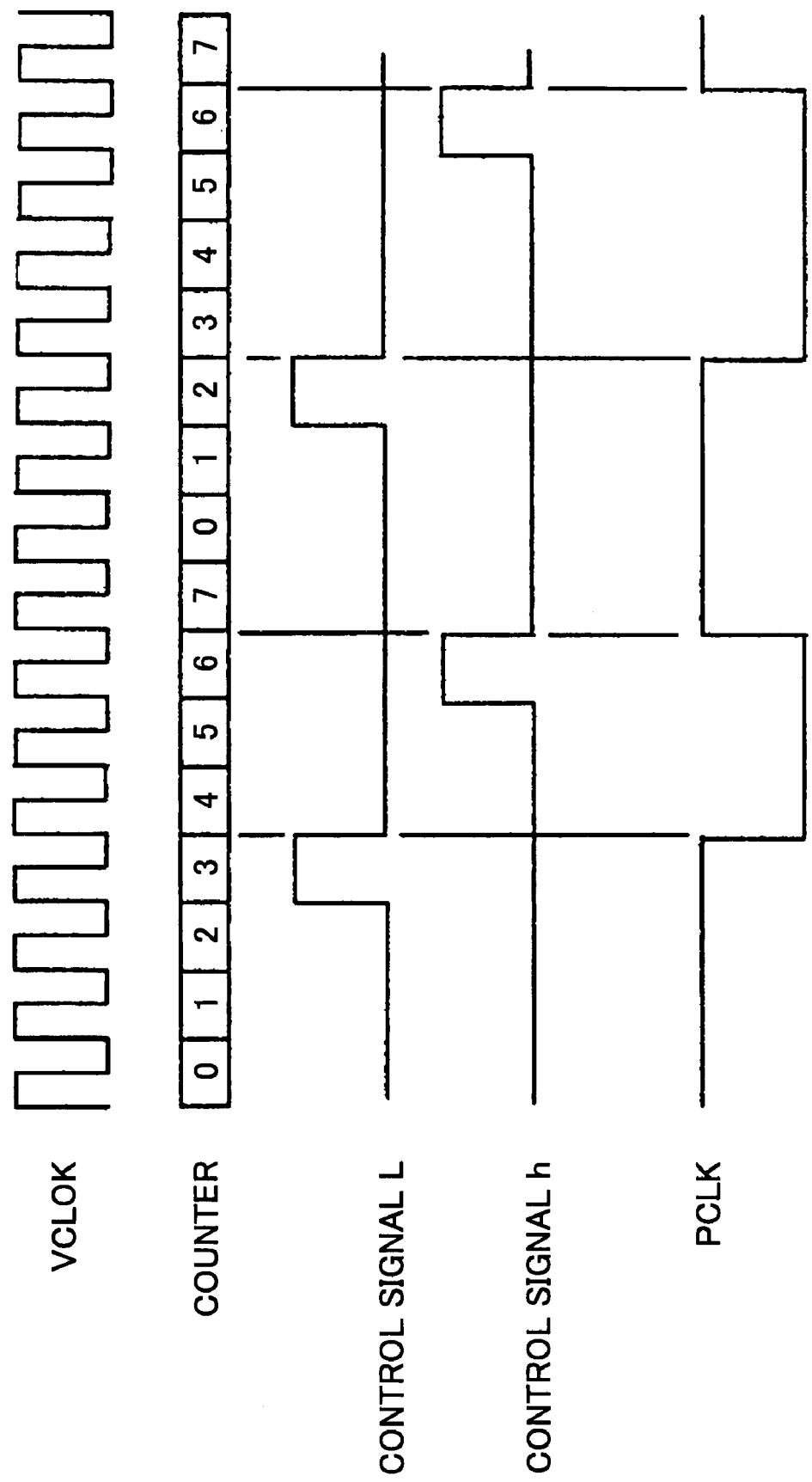
FIG. 10 is a timing chart showing operations for shifting a phase of a given pixel.

FIG. 10 is a timing chart showing operations for shifting a phase of a given pixel, in which the phase is delayed by ⅛ clock. When the duty is 50%, a setting value L=3 is provided and when the counter 403 (refer to FIG. 9) counts 4, the pixel clock PCLK is set to fall. When the phase is delayed by ⅛ clock, phase data H=6 is provided and the pixel clock is set to rise at 7 counts. At the same time, the counter is reset, so that the pixel clock is set to fall again in 4 counts. In other words, an adjacent pulse period is reduced by ⅛ clock.

The pixel clock PCLK generated in this manner is provided to the light source driving unit 411 (refer to FIG. 9) via the drawing control circuit 410 and the light source driving unit 411 drives the semiconductor laser using modulated data in which pixel data read out from the line buffer 407 is superposed on the pixel clock PCLK.

Figure 11:
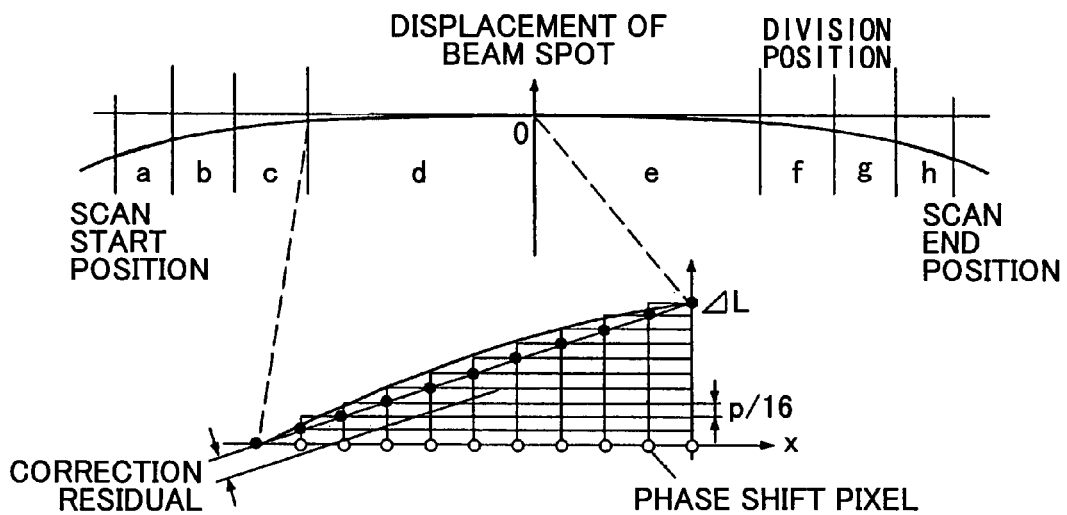
FIG. 11 is a graph showing an amount of correction of a main scanning position in each pixel in accordance with the main scanning position when a semiconductor laser is modulated using a single frequency.

FIG. 11 is a graph showing an amount of correction of the main scanning position in each pixel in accordance with the main scanning position when a semiconductor laser is modulated using a single frequency. The main scanning area is divided into plural areas (8 areas in the example), the number of phase shifts is set in each area such that displacement of the main scanning position is 0 at boundaries of each area by having a broken line approximation, and the main scanning position is gradually corrected. For example, when the number of pixels in an i area is Ni, an amount of shift in each pixel is based on 1/16 unit of a pixel pitch p and displacement of the main scanning position on both ends in each area is ΔLi, ni=Ni·p/16ΔLi.

Thus, the phase may be shifted in each ni pixel.

When the pixel clock is fc, a phase difference Δt in total is expressed as: $\Delta t = \frac{1}{16} fc \times \int (Ni/ni)di$, where the number of phase shifts is Ni/ni. Thus, it is possible to set the phase difference Δt in a pixel of N-th dot in the same manner based on an accumulated number of phase shifts.

In addition, widths of the divided areas may be equal or unequal and the number of division may be arbitrary. However, when the amount of shift is increased in each pixel, a difference of steps is likely to be noticeable in an image, so that the amount of shift is preferably not more than ¼ unit of the pixel pitch p. By contrast, when the amount of phase shift is reduced, the number of phase shift is increased and memory capacity to be required is increased. Further, in proportion as the number of division is reduced, the memory capacity to be required is reduced, so that it is efficient to set small area widths for areas where the displacement of the main scanning position is large and large area widths for areas where the displacement of the main scanning position is small. In general, a backlight of a beam emitted from the semiconductor laser is detected by a sensor for monitoring a quantity of light installed in the same package before the beam reaches an image area per scanning. While one line is being recorded, an amount of current applied to the luminous sources is controlled such that a constant light quantity is maintained.

Figure 12:
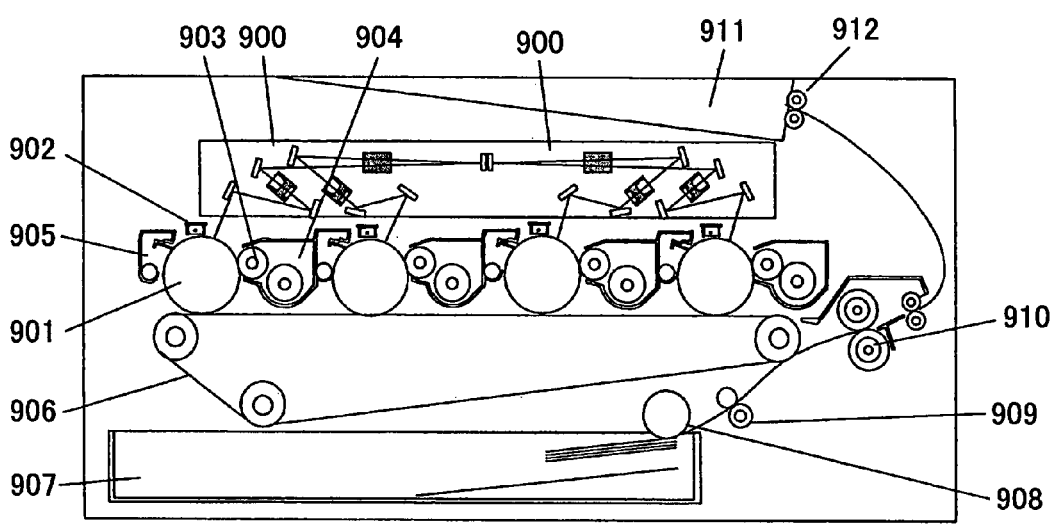
FIG. 12 is a front view schematically showing an example of an image forming apparatus according to the present invention.

FIG. 12 is a front view schematically showing an example of an image forming apparatus on which the optical scanning device shown in FIG. 1 is installed. It is also possible to construct the image forming apparatus shown in FIG. 12 using the optical scanning device shown in FIG. 16. Although the example shown in FIG. 12 includes four image forming stations, a structure of each station is the same, so that description is mainly based on a photoconductor drum 901 constituting a single image forming station. In the vicinity of the photoconductor drum 901, there are disposed a charger 902 for charging the surface of the photoconductor drum 901 to have a high voltage, a development roller 903 for attaching toner to an electrostatic latent image recorded when a optical scanning device 900 optically scans the surface of the photoconductor drum 901 and developing an image, a toner cartridge 904 for supplying toner to the development roller 903, and a cleaning case 905 for scraping and storing toner remaining on the photoconductor drum 901. On the surface of the photoconductor drum 901, image recording is performed in which two lines are recorded in one cycle in accordance with a reciprocating scanning of the above-mentioned oscillating mirror.

The four image forming stations constructed as mentioned above are arranged in parallel at regular intervals in a direction of movement of a transfer belt 906. In the image forming stations, toner images of yellow, magenta, cyan, and black are formed and a color image is formed by successively transferring and superposing these toner images on the transfer belt 906 while timing is adjusted. Each photoconductor drum is separately driven for rotation by a motor, so that it is possible to conduct fine adjustment of a rotation speed and it is possible to realize a relationship of $p=v/n \cdot f$ without using the above-mentioned adjustment of scanning frequency or an adjustment of beam pitch in the sub-scanning direction. Each image forming station basically has the same structure except different toner colors.

A paper feed tray 907 is detachably disposed on a bottom portion of the image forming apparatus. A sheet of recording paper is pulled out one by one from the paper feed tray 907 by a paper feed roller 908 and is sent by a pair of register rollers 909 in accordance with a time of a recording start in the sub-scanning direction. Toner images are transferred to the recording paper from the transfer belt 906, the toner images are fixed on the recording paper in a fuser roller 910, and the recording paper is ejected on a paper ejection tray 911 from a paper ejection roller 912.

As mentioned above, the image forming apparatus sequentially performs processes of charging, exposure, development, transfer, and cleaning on the photoconductor and subjects the recording paper to which toner images are transferred in the transfer process to a fixing process, thereby forming an image on the recording paper. These processes are referred to as an electrophotographic process and the above-mentioned optical scanning device performs the exposure process in the electrophotographic process.

The present invention is not limited to the specifically disclosed embodiment, and variations and modifications may be made without departing from the scope of the present invention.

The present application is based on Japanese priority application No. 2006-057530 filed Mar. 3, 2006, the entire contents of which are hereby incorporated herein by reference.

What is claimed is:

1. An optical scanning device comprising:
a light source unit having plural luminous sources;
a light source driving unit modulating each luminous source in accordance with pixel information;
an oscillating mirror supported on a twist beam as a rotation shaft, the oscillating mirror collectively deflecting light beams from the luminous sources and performing reciprocating scanning on a surface to be scanned;
an imaging optical system imaging the light beams from the luminous sources on the surface to be scanned;
an oscillating mirror driving unit setting a scanning frequency f in accordance with a resonance frequency of the oscillating mirror; and
a pitch adjustment unit adjusting beam spot intervals p in a sub-scanning direction in accordance with the scanning frequency f of the oscillating mirror that has been set.

2. The optical scanning device according to claim 1, wherein
the light source unit includes plural luminous sources as a semiconductor laser array arranged substantially in parallel with the rotation shaft of the oscillating mirror.

3. The optical scanning device according to claim 1, wherein
the light source driving unit adjusts a modulation frequency for each luminous source in accordance with the scanning frequency f of the oscillating mirror that has been set.

4. The optical scanning device according to claim 1, wherein
the light source driving unit performs image recording in one of going scan and returning scan of the oscillating mirror.

5. The optical scanning device according to claim 1, wherein
the oscillating mirror driving unit makes an adjustment such that the oscillating mirror has a predetermined swing angle in accordance with the scanning frequency f that has been set.

6. The optical scanning device according to claim 5, including:
a light detection unit detecting a light beam used for scanning by the oscillating mirror, wherein
the swing angle is corrected based on a detection signal.

7. An image forming apparatus moving a surface to be scanned in a sub-scanning direction and performing an electrophotographic process so as to form an image on the surface to be scanned, the image forming apparatus comprising an optical scanning device as a device for performing an exposure process in an electrophotographic process, the optical scanning device including:

a light source unit having plural luminous sources;

a light source driving unit modulating each luminous source in accordance with pixel information;

an oscillating mirror supported on a twist beam as a rotation shaft, the oscillating mirror collectively deflecting light beams from the luminous sources and performing reciprocating scanning on the surface to be scanned;

an imaging optical system imaging the light beams from the luminous sources on the surface to be scanned;

an oscillating mirror driving unit setting a scanning frequency f in accordance with a resonance frequency of the oscillating mirror; and a pitch adjustment unit adjusting beam spot intervals p in a sub-scanning direction in accordance with the scanning frequency f of the oscillating mirror that has been set.

8. The image forming apparatus according to claim 7, including:

a speed adjustment unit adjusting a movement speed v of the surface to be scanned in accordance with the scanning frequency f of the oscillating mirror that has been set.

* * * * *